United States Patent
Clontz

[11] Patent Number: 5,119,521
[45] Date of Patent: Jun. 9, 1992

[54] TAPE MEASURE FOR HAND TOOLS

[76] Inventor: William C. Clontz, 2542 Flora Vista Cir., Greensboro, N.C. 27406

[21] Appl. No.: 723,465

[22] Filed: Jun. 28, 1991

Related U.S. Application Data

[63] Continuation-in-part of Ser. No. 657,834, Feb. 21, 1991.

[51] Int. Cl.[5] .................................................. B25F 1/00
[52] U.S. Cl. ........................................... 7/164; 7/105; 7/143; 7/163; 7/167; 33/760
[58] Field of Search .................. 7/164, 163, 143, 105, 7/167, 170; 33/755, 760, 761, 767, 764

[56] References Cited

U.S. PATENT DOCUMENTS

| | | | |
|---|---|---|---|
| 111,327 | 1/1871 | Dillingham | 7/164 |
| 166,099 | 7/1875 | Hastings | 33/760 |
| 667,031 | 1/1901 | McGill | 7/164 |
| 889,570 | 6/1908 | Ayers | 33/761 |
| 1,218,798 | 3/1917 | Nelson | 7/163 |
| 1,797,360 | 3/1931 | Nee | 7/163 |
| 2,194,307 | 3/1940 | Jackson | 7/163 |
| 2,952,025 | 9/1960 | Johnson | 7/163 |
| 3,119,424 | 1/1964 | Henry | 7/164 |
| 4,794,692 | 1/1989 | Wang | 7/163 |

Primary Examiner—Roscoe V. Parker
Attorney, Agent, or Firm—Clifton T. Hunt

[57] ABSTRACT

A tape measure frame assembly is provided for installation within the handle of a hand tool. The assembly includes a gearing connection between the tape and a retracting spring, which enables the assembly to be elongated in conformity with the tool handle. When the hand tool is used, the tape measure is always present when needed.

5 Claims, 1 Drawing Sheet

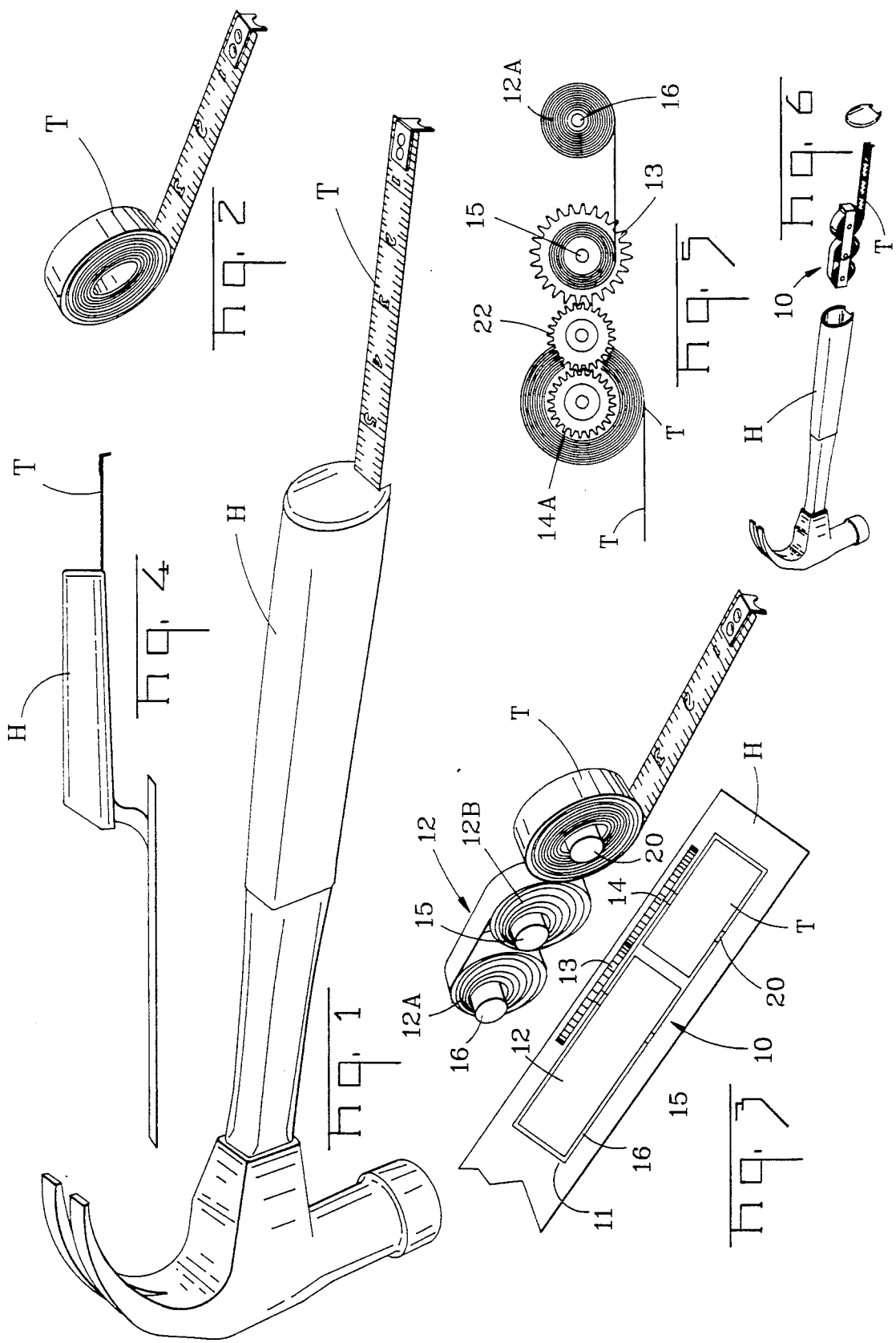

TAPE MEASURE FOR HAND TOOLS

CROSS-REFERENCE TO RELATED APPLICATION

This application is a continuation-in-part of U.S. patent application Ser. No. 07/657,834 filed Feb. 21, 1991 and now abandoned for COMBINATION HAND-TOOL AND TAPE MEASURE.

FIELD OF THE INVENTION

This invention relates to tape measures for hand tools and more specifically to a tape measure which may be carried in the handle of a tool for use and readily removed from the handle when desired.

BACKGROUND OF THE INVENTION

Carpenters, bricklayers, and other workmen using hand tools frequently need to measure lumber, distances between selected points, and a variety of other things connected with their work. The workman typically carries a conventional flexible tape measure with him to make the measurements.

The conventional flexible tape measure may comprise a metal or plastic housing with an elongated strip of flexible material of a selected length such as eight feet. The elongated strip of material may be metal, plastic, or cloth marked with suitable units of measurement and wound around a spring loaded shaft within the housing. In use, the free end of the tape is pulled far enough from the housing to expose enough tape to perform the desired measurement. When released, the spring loaded shaft retracts the tape into the housing.

The conventional tape measure is typically strapped to the workman's belt or carried in his pocket. In any case, the workman must put down the tools he is using to pick up and use the tape measure. Invariably, the tape measure will become misplaced, causing frustration and delay.

Several attempts have been made to overcome these problems by incorporating a tape measure with a hand tool. See, for example, the following patents:

| U.S. PAT. NO. | ISSUE DATE | INVENTOR | TITLE |
| --- | --- | --- | --- |
| 111,327 | Jan 31, 1871 | Dillingham | SCREW DRIVER |
| 166,099 | July 27, 1875 | Hastings | COMBINED KNIFE AND TAPE LINE |
| 667,031 | Jan 29, 1901 | McGill | COMBINED TAPE MEASURE AND IMPLEMENT HANDLE |
| 1,218,798 | Mar 13, 1917 | Nelson | SCISSORS GUIDE AND TAPE MEASURE |
| 1,797,360 | Mar 24, 1931 | Nee | LUMBERMAN'S TOOL |
| 2,194,307 | Mar 19, 1940 | Jackson | PAPERHANGER'S KNIFE |
| 2,952,025 | Sep 13, 1960 | Johnson | TAPE MEASURING GUIDE KNIFE FOR CUTTING SHEET ROCK, PLASTER BOARD AND SIMILAR MATERIALS |
| 3,119,424 | Jan 28, 1964 | Henry | UTILITY TOOL FOR CARPENTER |
| 4,794,692 | Jan 3, 1989 | Wang | EXTENDABLE AND RETRACTABLE MULTIPURPOSE MINIATURE HAND TOOL FOR USE IN MEASUREMENT, SNIPPING AND CUTTING |

Some of the foregoing prior art uses the conventional tape measure with the flexible strip, marked with suitable indicia for measuring, wrapped around a coiled spring to retract the measuring strip after use. This arrangement is too bulky to be satisfactorily housed in the handle of a tool such as a hammer so that the tape extends longitudinally of the handle. Others, U.S. Pat. No. 1,218,798 to Nelson, for example, locates the flexible tape beside the coiled spring, but this arrangement merely repositions the bulk in a direction transversely of the handle and does not conform with the shape of a hammer handle. The tape 110 in U.S. Pat. No. 3,119,424 to Henry extends longitudinally of the tool, but the tape is housed in the relatively bulky head of the tool instead of in the relatively narrow handle.

SUMMARY OF THE INVENTION

The present invention provides a retractable tape measure particularly adapted for installation in the elongated handle of a tool such as a hammer. Preferably, the tape measure is installed to be extendable longitudinally of the handle, but its utility is not so limited. It may be installed in any desired tool and extend longitudinally or transversely to the tool, as desired.

The tape measure retains the concept of using a coiled spring to retract the tape after use, but the spring is spaced longitudinally from the tape instead of transversely as in the prior art to reduce the bulbous or transverse bulkiness of the prior art tape measures installed in tools. The configuration of the present tape measure is elongated in conformity with the tool handle for which it is made.

For example, a standard eight foot flexible tape measure that is one half inch wide is assembled within a frame with gears connecting the tape to a spring for retraction. The tape measure assembly has outside dimensions of 2 and ⅞ inches long, 13/16 of an inch high and 9/16 of an inch wide, and comfortably fits within the free end portion of the average hammer handle having cross sectional dimensions greater than one inch.

The tape measure assembly is self contained and may be either permanently mounted within the tool handle or mounted within the handle of the tool so it can be easily removed and snapped back in place within the tool handle when desired. Other embodiments within the scope of the invention may locate the tape measure frame assembly exteriorly of the tool.

BRIEF DESCRIPTION OF THE DRAWINGS

FIG. 1 is a perspective view of a hammer with the tape measure frame assembly installed in the handle and showing a length of flexible tape extending longitudinally from the end of the handle;

FIG. 2 is an enlarged perspective view of the flexible tape removed from the hammer;

FIG. 3 is an exploded perspective view of the tape measure frame assembly removed from the hammer;

FIG. 4 is side view of a trowel with the tape measure frame assembly installed in the handle and showing a length of flexible tape extending longitudinally from the end of the handle;

FIG. 5 is a somewhat schematic side elevation of a modified form of the invention; and FIG. 6 is an exploded perspective view of a hammer and the tape measure frame assembly, illustrating that the tape measure frame assembly is removable from the handle and can snap in and out of the handle.

DETAILED DESCRIPTION OF THE INVENTION

Referring more specifically to the drawings, a hammer has the usual head and a handle indicated at H. A tape measure frame assembly, broadly indicated at 10 in FIG. 3, is mounted within the free end portion of the handle H and a length of tape T is shown extending from the free end of the handle H. A trowel is illustrated in FIG. 4. The trowel has the usual blade and a handle H fastened to the blade in the usual way. The tape measure frame assembly 10 is mounted within the free end portion of the handle H and a length of tape T is shown extending from the free end of the handle H.

Although only two embodiments of the tape measure frame assembly are illustrated for the purpose of explaining the invention, the invention includes the combination of the tape measure frame assembly with other hand tools.

Referring to FIG. 3, the tape measure frame assembly 10 includes a frame 11, the roll of flexible tape T, a coiled spring 2, and gears 13 and 14. The frame 11 is an elongated piece of metal slightly wider than the tape T and having cutout portions to receive the roll of tape T and the coiled spring 12.

The spring 12 is wrapped in two coils 12A and 12B with the inner end of spring coil 12B fixed to a rotatable spring shaft 15 and the inner end of the coil spring 12A fixed to a stationary shaft 16. The spring shaft 15 supports the gear 13 which is rotatable in response to expansion and retraction of the spring 12. The inner end of the roll of tape T is fixed to a rotatable tape shaft 20 which supports the gear 14. The gear 14 rotates in response to extension and retraction of the tape T. therewith. The shafts 15 and 20 extend transversely of the frame 11 and are journaled in opposing sides of the frame, and the gears 13 and 14 are arranged in intermeshing relation with each other.

In use, the free end of the tape T is pulled from the handle H for a measurement, causing the tape shaft 20, connected to the inner end of the tape T, to rotate in a counterclockwise direction in FIG. 3 and impart corresponding rotation to the tape gear 14. As the tape gear 14 turns in a counterclockwise direction, it rotates the spring gear 13 and its shaft 15 in a clockwise direction in FIG. 3. Clockwise movement of the spring shaft 15 tightens the coil of spring on the spring shaft 15 and tends to tighten the coil of spring on the lock stationary shaft 16 as the spring moves in a clockwise direction in FIG. 3.

The resulting tension causes the spring shaft 15 and its spring gear 13 to rotate in a counterclockwise direction when the tape T is released. This counterclockwise rotation of spring gear 13 moves tape gear 14 clockwise in FIG. 3 and retracts the tape T within the handle H.

The gears 13 and 14 in FIG. 3 are the same size, but the use of a tape gear 14A (FIG. 5) that is smaller than the spring gear 13 will allow the use of a shorter and stronger spring 12A. A spacer gear 22 between the tape gear and the spring gear increases efficiency where the tape gear 14A is smaller than the spring gear 13.

In FIG. 5, the tape shaft 20 for the tape T is fixed to gear 14A which is smaller than gear 13 to which the spring shaft 15 is connected. A spacer gear 22 is fitted between tape gear 14A and spring gear 13 in meshing relation with both gears. Thus, as the tape T is pulled to the left in FIG. 5, gear 14A rotates in a clockwise direction; spacer gear 22 rotates in a counterclockwise direction; and spring gear 13 rotates in a clockwise direction, which tends to move the spring 12 coiled on stationary shaft 16 in a counterclockwise direction. The longitudinal dimension of the frame 11 is increased to accommodate the spacer gear 22, but the transverse dimension remains the same as in the embodiment of FIG. 3.

Referring to FIG. 6, the tape measure frame assembly 10 is shown removed from the handle H of the tool. The frame assembly 10 may be permanently installed within the handle H as shown in FIG. 3, or may be mounted within the handle H for easy removal as shown in FIG. 6.

It is recognized that other embodiments within the scope of the invention will occur to those skilled in the art.

Although specific terms have been used in describing the illustrated embodiment of the invention, they have been used in a generic and descriptive sense only and not for the purpose of limitation.

I claim:

1. A self-contained tape measure frame assembly shaped and dimensioned to be removably housed within a conventional elongated tool handle, said assembly comprising an elongated frame having a front end and a rear end, a rotatable tape shaft spaced rearwardly from the front end of the frame and extending transversely of the frame with the ends of the tape shaft journaled in the frame, a roll of flexible tape having a free end and fixed at the other end to the tape shaft for rotation therewith, a tape gear mounted on the tape shaft beside the roll of tape, a rotatable spring shaft extending transversely of the frame and journaled in the frame in rearwardly spaced parallel relation to the tape shaft, a stationary shaft extending transversely of the frame and fixed to the frame in rearwardly spaced parallel relation to the spring shaft, a coiled spring fixed at one end to the rotatable spring shaft and fixed at its other end to the stationary shaft, a spring gear mounted on the spring shaft beside the coiled spring and in intermeshing relation with the tape gear, and the spring shaft being spaced rearwardly from the tape shaft a sufficient distance that the coiled spring is spaced rearwardly from the roll of tape at all times, whereby the transverse dimension of the frame assembly is minimized and whereby the coiled spring is tensioned when the free end of the tape is extended beyond the frame and the coiled spring relaxes and retracts the tape on the tape shaft when the free end of the tape is released.

2. A self-contained tape measure frame assembly according to claim 1 wherein the frame assembly is permanently mounted in a tool handle.

3. A self-contained tape measure frame assembly according to claim 1 wherein the frame assembly is removably mounted in a tool handle.

4. A self-contained tape measure frame assembly according to claim 1 wherein the tape gear and the spring gear are the same size.

5. A self-contained tape measure frame assembly according to claim 1 wherein the tape gear is smaller than the spring gear, and a spacer gear is fitted between the tape gear and the spring gear in meshing relation to both of said gears.

* * * * *